(No Model.)
G. SOBOTKA & A. KLIEMETSCHEK.
METHOD OF AND APPARATUS FOR PRODUCING CLEAR WORT.
No. 470,902. Patented Mar. 15, 1892.
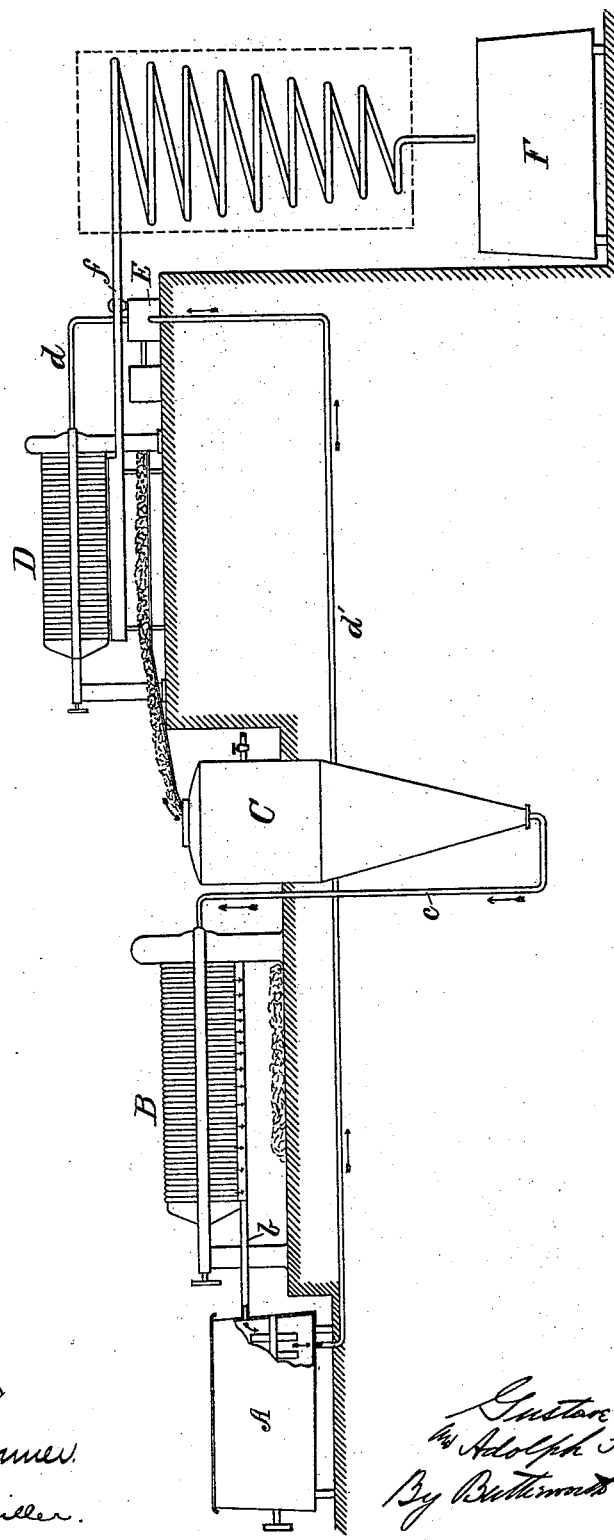

United States Patent Office.

GUSTAVE SOBOTKA AND ADOLPH KLIEMETSCHEK, OF NEW YORK, N. Y., ASSIGNORS TO FLEISCHMANN & CO., OF SAME PLACE.

METHOD OF AND APPARATUS FOR PRODUCING CLEAR WORT.

SPECIFICATION forming part of Letters Patent No. 470,902, dated March 15, 1892.

Application filed August 20, 1891. Serial No. 403,209. (No model.)

*To all whom it may concern:*

Be it known that we, GUSTAVE SOBOTKA and ADOLPH KLIEMETSCHEK, citizens of Austria-Hungary, residing at New York, in the county of New York and State of New York, have invented certain new and useful Improvements in Methods of and Apparatus for Producing Clear Wort; and we do hereby declare the following to be a full, clear, and exact description of the invention, such as will enable others skilled in the art to which it appertains to make and use the same.

Our invention relates to improvements in the method of and apparatus for producing clear wort; and the object of the invention is to provide a simple and efficient method and apparatus by which clear wort may be obtained at a single pressing of the first mash in the process, thereby dispensing with a number of pressings which are required in practicing methods and by the use of apparatus such as have heretofore been proposed, and thus effecting a great saving of time and labor and at the same time rendering it possible to obtain from a given quantity of material a quantity of clear wort greater in amount than can be obtained from the same amount of material treated according to previous methods, and also of superior quality.

According to previous methods it has been the practice to steep ground malt in cold water and extract the solution of the ground steeped malt by means of a filter-press, this operation being known as the "first pressing." Such malt-extract solution has then been mixed with finely-ground rye or other grain, and to this mixture has been added a liquid solution obtained by mixing the cakes of grain taken from the first pressing and those taken from the third pressing by a previous mash with water and boiling the same under high pressure and then pressing out the liquid, (the latter pressing being known as the "second pressing,") and finally pressing this mixture containing the added liquid for the purpose of obtaining a clear wort, the latter pressing being known as the "third pressing."

By our present method we prepare a mash from which clear wort is extracted by the first pressing in the process, and the cakes of grain taken from such pressing are subjected to a cooking process and forced into a filter-press, from which the dissolved starch and albuminous substances are allowed to run into the mash-tub for use in a subsequent mash, while the cakes of grain remaining in the press after such second pressing are removed and used for cattle-food. We thus dispense altogether with the third pressing, which has been necessary in obtaining clear wort in accordance with previous methods.

The accompanying drawing represents a side elevation, partly in section, of an apparatus such as we propose to use in carrying out our process; but it will be understood, of course, that the construction and arrangement of the apparatus may be varied at pleasure and that the process may be practiced in a number of ways and by the use of any suitable apparatus adapted to carry the same into effect, the apparatus shown being only a preferred form.

A denotes a mash-tub; B, a filter-press communicating with said tub by means of a pipe $b$.

C denotes a tank or "cooker," which is connected with the press B by means of a pipe $c$.

D denotes a filter-press into which a pipe $d$ leads from a pump E.

F denotes a fermenting-vat, which is connected with the filter-press D by means of a pipe $f$.

$d'$ denotes a pipe, which connects the mash-tub A with the pump E, and said tub is connected to the filter-press D through the pump E by means of the pipes $d$ $d'$.

With an apparatus constructed as thus described and provided with the necessary valves for cutting off and controlling the flow of the liquid we commence operations by placing in the mash-tub A ground rye and corn-malt mixed with water, and this mixture is thoroughly agitated and heated to the desired temperature for the mash by forcing steam into the mixture, and after allowing the mash to stand a sufficient time—usually about two hours—the contents of the tub are forced by the pump E through the pipes $d$ $d'$ into the filter-press D, from which the clear wort is conducted by means of the pipe $f$ and a suitable coil or cooling apparatus into the fermenting-tub F. The cakes of grain remaining in the press D are taken therefrom and placed in the tank or cooker C and mixed with water which is heated and forced therefrom by steam-pressure while boiling hot into the filter-press B through the pipe c, so as to separate therefrom the liquid starch and albuminous substances in solution, which are conducted by means of the pipe b into the mash-tub A, which will contain a sufficient quantity of corn-malt, rye, and water to be heated to the desired temperature by the liquid contents of the cooker thus conducted into the same, the heat of the said solution being used to bring the contents of the mash-tub to the temperature necessary for saccharification. After the saccharification is completed the mash is pumped, in the manner previously described, by the pump E into the filter-press D for the purpose of obtaining a perfectly clear wort, which is allowed to run into the fermenting-tub F through the pipe f and cooling apparatus, as above described. The cakes of grain taken from the filter-press B are removed and may be used as cattle-food.

It is possible to obtain good results by extracting the hot liquid from the boiled mixture without running it through a filter-press, an ordinary filtering apparatus being used for this purpose without subjecting the mixture to pressure; but in order to produce satisfactory results and thoroughly extract the liquid contents of the cooker we preferably use a filter-press, although we do not desire to limit our invention to this specific method of extracting the hot liquid.

Having thus described our invention, what we claim, and desire to secure by Letters Patent, is—

1. The herein-described process of making clear wort, which consists, first, in mixing corn-malt, rye, and water; second, in mingling with this mixture a hot liquid extracted from a boiled mixture of water and cakes of grain taken from the first pressing of a preceding mash, and finally pressing the latter mixture to obtain clear wort, substantially as described.

2. The process of making clear wort, which consists, first, in mixing corn-malt, rye, and water; second, mixing the cakes of grain of the first pressing by a previous mash with water and boiling this mixture; third, pressing the boiled mixture and mixing the hot liquid obtained by such pressing with the mixture of corn malt, rye, and water, and finally pressing the latter mixture to obtain a clear wort, substantially as described.

3. The combination of the mash-tub, the pump, the filter-press, the pipes connecting said mash-tub and filter-press through said pump, the cooker, and a second filter-press connected by suitable pipes to said cooker and mash-tub, substantially as described.

In testimony whereof we affix our signatures in presence of two witnesses.

GUSTAVE SOBOTKA.
ADOLPH KLIEMETSCHEK.

Witnesses:
HENRY J. KALTENBACH,
JACOB BENNINGER, Jr.